Sept. 18, 1945.   J. W. BAYLESS   2,385,186
TEST METHOD AND SYSTEM FOR VARIABLE GAIN AMPLIFIERS
Filed June 26, 1942
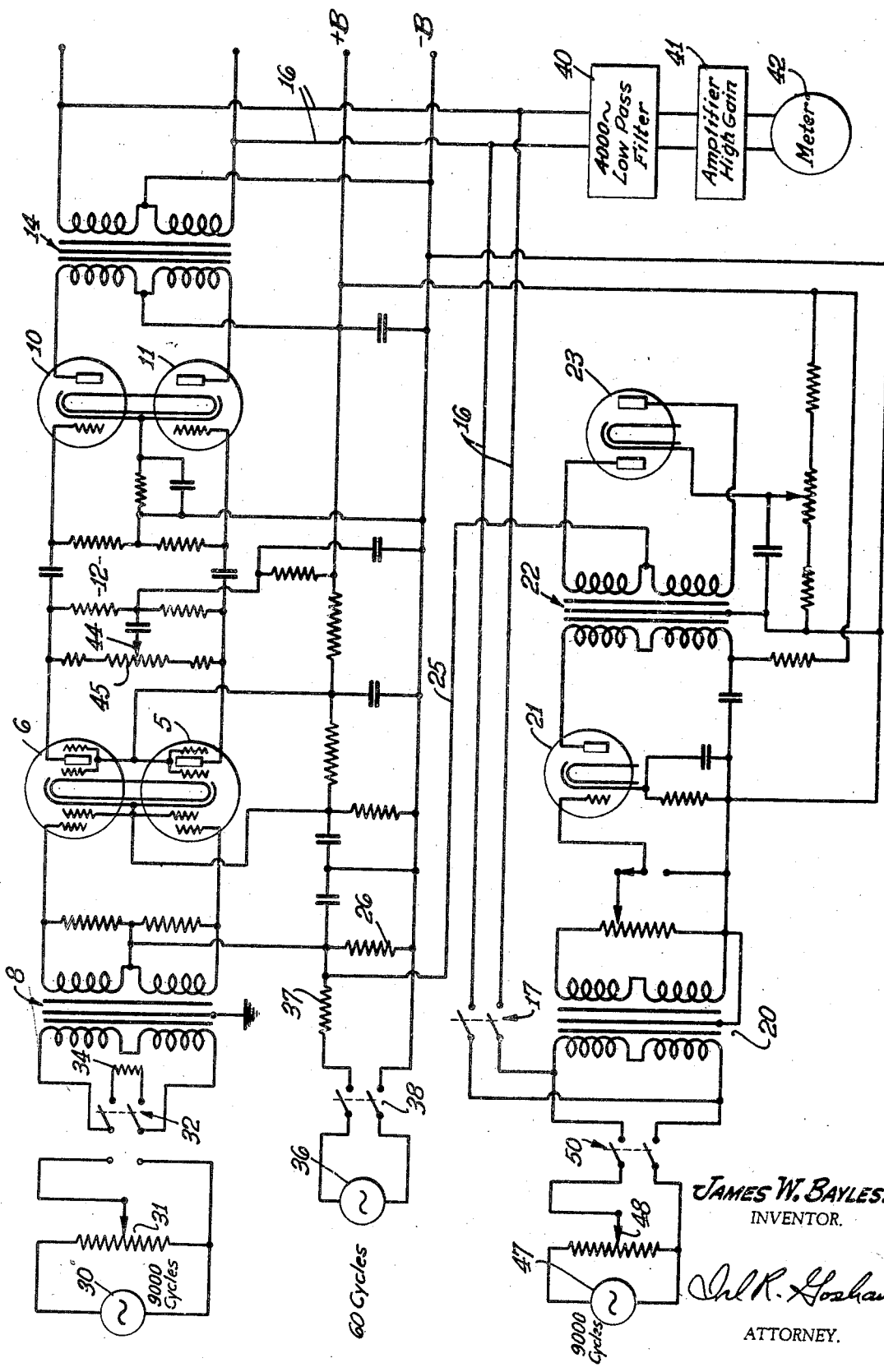
JAMES W. BAYLESS,
INVENTOR.
ATTORNEY.

Patented Sept. 18, 1945

2,385,186

UNITED STATES PATENT OFFICE 2,385,186

TEST METHOD AND SYSTEM FOR VARIABLE GAIN AMPLIFIERS

James W. Bayless, Los Angeles, Calif., assignor to Radio Corporation of America, a corporation of Delaware Application June 26, 1942, Serial No. 448,576

12 Claims. (Cl. 179—175.31)

This invention relates to electrical current transmission systems and particularly to a method of and means for testing variable gain portions of such transmission systems.

In electrical transmission systems employed for sound recording, broadcasting, public address systems and the like, it has been found desirable to vary the amplification or attenuation of the currents being transmitted. For instance, in sound recording wherein a photographic record is made on a motion picture film, the physical limitation of the sound track portion of the film necessitates the reduction of the range of the original signals in order to accommodate them within the sound track area. The manner of accomplishing the variation in gain or attenuation is generally by the use of electronic vacuum tubes such as the variable mu type, these tubes usually being used in a push-pull relationship to avoid introducing distortion into the signal by the variations in control voltage on the grids of the tubes. The greater the unbalance of these tubes and circuits, the greater the distortion introduced.

Thus, it is particularly desirable to have not only the circuits balanced, but also to use balanced or identical tubes in each half of the push-pull system. The physical elements of the circuit such as the resistances, capacitances and inductances can be easily measured, but this is not true of the vacuum tubes which are usually not identical over their entire operating range. Although these tubes may be balanced statically at one or more grid biases, it is not an indication that they are in balance dynamically. Thus, to select tubes which are dynamically balanced, it is necessary to provide a test system wherein any discrepancies between the actual operating characteristics of the tubes may be quickly realized.

Means of balancing push-pull tubes and circuits at one or more settings of grid bias are well known in the art, such as shown in Lavoie Patent No. 1,948,303 of February 20, 1934 and Meisner Patent No. 1,946,092 of February 6, 1934. In all the prior art systems, however, none provide a truly dynamic test for each and every point on the characteristic curve. The prior art systems are concerned with tubes operating with a fixed bias while applicant's problem involves the balancing of push-pull tubes having a varying grid bias such as found in compressor and expander systems.

The principal object of the invention, therefore, is to provide improved means for facilitating the balancing of variable gain amplifier electronic devices.

Another object of the invention is to provide improved means for facilitating the testing of a variable gain amplifier to facilitate the selection of balanced vacuum tubes therefor.

A further object of the invention is to provide a test system for a variable gain amplifier unit, wherein a rapid dynamic balance test may be made.

A further object of the invention is to provide a dynamic test system for variable gain amplifiers to facilitate the selection of balanced or identical vacuum tubes.

Although the novel features which are believed to be characteristic of the invention are pointed out with particularity in the claims appended herewith, the manner of its organization and the mode of its operation will be better understood by referring to the following description, read in conjunction with the accompanying drawing in which the single drawing is a schematic circuit of a compressor unit embodying the invention.

Referring to the drawing, the variable gain amplifier shown therein is of the type disclosed and claimed in Singer Patent No. 2,255,683 of September 9, 1941, wherein the gain of a pair of variable mu tubes 5 and 6 is controlled by a portion of the rectified output thereof. Briefly describing the operation of the compressor, a signal is impressed over an input transformer 8 to the grids of variable mu tubes 5 and 6, the output circuits of which are coupled by a resistance-capacitance network 12 to a fixed gain push-pull amplifier including tubes 10 and 11. The output of the fixed gain tubes 10 and 11 is transmitted over a transformer 14 to a sound recorder or other transmission elements of the system, a portion of the output being impressed over conductors 16, when a switch 17 is closed, on an input transformer 20 of an amplifier 21. The output of amplifier 21 is transmitted over transformer 22 to a rectifier 23. The rectified currents from rectifier 23 are fed over conductor 25 to a resistance 26, which varies the biasing potential on the grids of tubes 5 and 6 and thereby varies their gain as disclosed in detail in the above-mentioned Singer patent.

It is realized from the above that should either of tubes 5 or 6 or their respective circuits be unbalanced, the variations in rectified current from the rectifier 23 will not be balanced out or neutralized and will be introduced as longitudinal currents into the push-pull system and appear in the signal. Since it is desirable that the compressor operate as rapidly as possible, the amount of filtering introduced is limited, which increases the need for good balance to eliminate harmonics.

From the above it is realized that a very accurate balance is required not only in the circuit, but also in the tubes which form a portion of the circuit. It has been found that the static testing of tubes for these circuits is unsatisfactory as balanced tubes from a static test have been sufficiently unbalanced from a dynamic standpoint to be unsuitable for service as variable gain amplifiers wherein their gain is varied from time to time. For fixed gain tubes such as tubes 10 and 11 the static test may be satisfactory, although the present system is also suitable for obtaining a dynamic balance in the tubes 10 and 11.

The above circuit shows elements which may be combined to provide two types of tests, one test involving the impression of a varying amplitude constant frequency current of 9,000 cycles over transformer 8 to simulate the application of a signal through the system. Thus, a 9,000 cycle oscillator 30 is provided with a potentiometer 31 for varying the amplitude of the output of the oscillator and a double-throw switch 32 is employed to connect the oscillator 30 to the transformer 8 when the switch 32 is in its left-hand position. When the oscillator 30 is not used, the switch 32 may be thrown to its right-hand position and a terminating impedance 34 is then connected across the primary of the transformer 8. A sixty cycle constant amplitude oscillator 36 is used in both tests. The oscillator is connected across the grid biasing resistance 26 over a load resistance 37 when a switch 38 is closed. This 60 cycle oscillator supplies the test current. A 4,000 cycle low pass filter 40 is also used in both tests. The output of the filter 40 is amplified in a high gain amplifier 41 and is applied to a meter 42. The amplifier 41 should have a high gain in the neighborhood of 90 db in order to raise the amplitude of unbalanced components to a value where they will be readable on the meter 42.

To apply the first test, the switch 32 is thrown to its left-hand position and the switches 17 and 38 are closed. The current from 9,000 cycles from oscillator 30 should now be manually varied in amplitude by means of the potentiometer 31, this current passing through the variable gain tubes 5 and 6, fixed gain tubes 10 and 11, through amplifier 21, and through the rectifier 23. The variations in amplitude of the 9,000 cycle current will appear as direct current voltage variations across the resistance 26, and will thereby simultaneously vary the bias and gain of tubes 5 and 6 as this voltage is impressed in an in-phase relationship. If any unbalance exists at certain amplitudes of the 9,000 cycle current controlling the gain of tubes 5 and 6, more-or-less of the 60 cycle current will appear at meter 42, the 4,000 cycle low pass filter eliminating the 9,000 cycle tone. In this manner, the grids of tubes 5 and 6 are varied in gain over their complete operating range of grid bias, while transmitting currents corresponding to a normal signal. It has been found in using such a dynamic test that two tubes may be perfectly balanced statically at the extremities of their grid bias range and be very much off balance in their middle range. The above test will disclose any such discrepancies.

A variable tap 44 on resistance 45 is provided to aid in balancing the circuit and the tubes. For extreme unbalanced conditions, however, it is necessary to substitute tubes with more identical dynamic characteristics.

The other test for balance is accomplished by applying the 9,000 cycle variable amplitude frequency directly on the primary of transformer 20 by the use of an oscillator 47 having a variable potentiometer 48 in its output circuit. The 9,000 cycle current from oscillator 47 is applied when switch 50 is closed and when so used the switch 32 is thrown to its right-hand position to disconnect the oscillator 30 and to terminate the transformer 8 across resistance 34. The 60 cycle current is still impressed across the resistance 26 and the switch 17 is now opened. Thus, the 60 cycle output of oscillator 47 provides the test current while the 9,000 cycles provides the grid bias or gain control voltage. This particular test may be made very rapidly, and although the tubes 5 and 6 do not transmit the 9,000 cycles, any unbalance of these tubes will permit the 60 cycle current to appear at meter 42 in proportion to the amount of unbalance existing.

The above two tests differ solely in the point of application of the 9,000 cycle variable amplitude current, the first-mentioned test being preferred as it more nearly simulates the normal operation of the compressor and tests the unbalance of the entire compressor unit.

I claim as my invention:

1. In a test system for a push-pull variable gain amplifier, the combination of a pair of vacuum tubes in push-pull relationship, means for applying a relatively low cyclic voltage variation to the gain control electrodes of said tubes in phase to simultaneously vary the voltages on said electrodes in the same direction, means for applying a relatively high frequency voltage variation to the control grids of said tubes in phase opposition to simultaneously vary the voltage on said electrodes in opposite directions, and means for measuring the amount of said in-phase voltage introduced in the output circuit of said variable gain amplifier during said voltage variations.

2. The combination in accordance with claim 1 in which means are provided for varying the amplitude of said high frequency voltage impressed on said tubes and impressing a direct current voltage on the control electrodes of said tubes, said direct current voltage varying in amplitude in accordance with the variations in amplitude of said high frequency voltage and varying the voltage on said electrodes in the same direction at any instant.

3. The combination in accordance with claim 1 in which said low frequency voltage is a sixty-cycle constant amplitude voltage, the frequency of said high frequency voltage is approximately 9,000 cycles and means are provided for rectifying said 9,000 cycle voltage.

4. The method of testing a push-pull variable gain amplifier comprising impressing a relatively low frequency voltage on the control grids of the tubes of said amplifier in an in-phase relationship to simultaneously vary the voltage on said control grids in the same direction at any instant, simultaneously impressing a relatively high frequency varying amplitude voltage on said grids in an out-of-phase relationship to simultaneously vary the voltage on said control grids in opposite directions at any instant, and measuring the amount of low frequency voltage present in the output circuit of said tubes during said voltage variations.

5. The method of testing in accordance with claim 4 in which said high frequency voltage is manually varied in amplitude over a predetermined range, said high frequency being rectified and applied to said control grids to vary the voltage thereon in the same direction simultaneously.

6. The method of testing in accordance with claim 4 in which said high frequency voltage is rectified after amplification by said tubes, said rectified current controlling the voltage impressed on said tubes to vary their grid potential in the same direction at any instant.

7. A test system for a push-pull variable gain amplifier comprising a pair of vacuum tubes connected in a push-pull relationship, means in the common grid circuit of said tubes to vary the grid bias thereof simultaneously in the same direction, means for impressing a periodically varying current on said means, means for generating a high frequency voltage, means for impressing said voltage on the grids of said tubes to vary the grid bias in opposite directions at any instant, means for rectifying said voltage after amplification by said tubes, means for impressing the products of rectification on said first-mentioned means, and means for measuring the amplitude of said periodically varying current obtained in the output circuit of said tubes during said grid bias variations.

8. A test system for a push-pull amplifier comprising a pair of vacuum tubes connected in a push-pull relationship, means in the common grid circuit of said tubes for varying the grid bias thereof, means for generating a low frequency current, means for generating a relatively high frequency current for varying the voltage on said grids in opposite directions at any instant, means for rectifying said high frequency current, means for impressing said low frequency current and said rectified current on said first-mentioned means to simultaneously vary the voltage on said grids in the same direction at any instant, and means for measuring the amount of low frequency current in the output circuit of said vacuum tubes during variations in said voltages on said grids.

9. A test system in accordance with claim 8 in which the amplitude of said high frequency current is varied between predetermined limits.

10. A test system in accordance with claim 8 in which the frequency of said low frequency current is substantially 60 cycles and the frequency of said high frequency current is substantially 9,000 cycles and of varying amplitude.

11. A test system for a push-pull amplifier having a pair of tubes comprising means for generating a relatively high frequency voltage, means for varying the amplitude of said voltage, means for impressing said voltage on said tubes in phase opposition to vary the voltage on said grids of said tubes in opposite directions at any instant, means for generating a relatively low frequency voltage, means for impressing said low frequency voltage on said tubes in phase to vary the voltage on said grids in the same direction at any instant, and means for simultaneously impressing a direct current voltage on said tubes to vary the voltage on said grids in the same direction at any instant.

12. A test system in accordance with claim 11 in which said direct current voltage is varied in amplitude in accordance with the variations in amplitude of said high frequency voltage.

JAMES W. BAYLESS.